(12) United States Patent
Simpson

(10) Patent No.: US 10,267,430 B2
(45) Date of Patent: Apr. 23, 2019

(54) BACKFLOW PREVENTION VALVE

(71) Applicant: HAMILTON SUNDSTRAND CORPORATION, Charlotte, NC (US)

(72) Inventor: Scott W. Simpson, Easthampton, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 3 days.

(21) Appl. No.: 15/584,714

(22) Filed: May 2, 2017

(65) Prior Publication Data

US 2017/0234451 A1    Aug. 17, 2017

Related U.S. Application Data

(63) Continuation of application No. 13/901,124, filed on May 23, 2013.

(51) Int. Cl.
| | |
|---|---|
| *F16K 31/00* | (2006.01) |
| *F16K 31/122* | (2006.01) |
| *F01D 17/10* | (2006.01) |
| *F02C 9/18* | (2006.01) |
| *F02C 9/48* | (2006.01) |

(52) U.S. Cl.
CPC .......... *F16K 31/122* (2013.01); *F01D 17/105* (2013.01); *F02C 9/18* (2013.01); *F02C 9/48* (2013.01); *F05D 2270/10* (2013.01)

(58) Field of Classification Search
CPC .. F02C 9/18; F02C 9/48; F01D 17/105; F16K 31/122
USPC .......................................................... 251/63
See application file for complete search history.

(56) References Cited

U.S. PATENT DOCUMENTS

| | | | |
|---|---|---|---|
| 3,263,702 A * | 8/1966 | Pullen ................. | B64D 15/166 137/625.27 |
| 3,999,813 A | 12/1976 | Whitaker | |
| 4,061,155 A | 12/1977 | Sopha | |
| 4,251,985 A | 2/1981 | Sullivan | |
| 4,256,017 A | 3/1981 | Eastman | |
| 4,320,872 A | 3/1982 | Frederick | |
| 7,066,710 B2 * | 6/2006 | Wiggins ............. | F16K 31/1635 137/488 |
| 7,938,143 B2 | 5/2011 | Nagasaki et al. | |

(Continued)

OTHER PUBLICATIONS

European Search Report for Application No. 14169483 dated Oct. 29, 2014, 5 pages.

*Primary Examiner* — Umashankar Venkatesan
(74) *Attorney, Agent, or Firm* — Cantor Colburn LLP

(57) ABSTRACT

A valve assembly includes an outer housing having a first opening in fluid communication with a first fluid, a second opening in fluid communication with a second fluid, a third opening in fluid communication with a third fluid and a fourth opening in fluid communication with a fourth fluid. The valve assembly includes a piston configured to slide within the outer housing into a first position at which the third opening is blocked from fluid communication with the fourth opening based on a fluid pressure of the first fluid being greater than a fluid pressure of the fourth fluid. The piston is further configured to slide within the outer housing into a second position at which the third opening is in fluid communication with the fourth opening based on the fluid pressure of the second fluid being greater than the fluid pressure of the fourth fluid.

9 Claims, 4 Drawing Sheets

(56) References Cited

U.S. PATENT DOCUMENTS

| | | |
|---|---|---|
| 8,011,387 B2 | 9/2011 | Cheong |
| 8,082,952 B2 | 12/2011 | Veilleux |
| 8,684,038 B2 | 4/2014 | Schudt et al. |
| 9,110,475 B2 * | 8/2015 | Simpson ................ B64D 13/04 |
| 9,822,900 B2 * | 11/2017 | Franconi ............. F16K 31/1225 |
| 2010/0083667 A1 | 4/2010 | Franconi |
| 2010/0326089 A1 | 12/2010 | Weber |
| 2011/0168012 A1 | 7/2011 | Reust |
| 2014/0346379 A1 | 11/2014 | Simpson |
| 2014/0366964 A1 * | 12/2014 | Kamp ................. F16K 31/1245 137/486 |
| 2014/0366965 A1 * | 12/2014 | Simpson ............ F16K 31/1635 137/500 |

\* cited by examiner

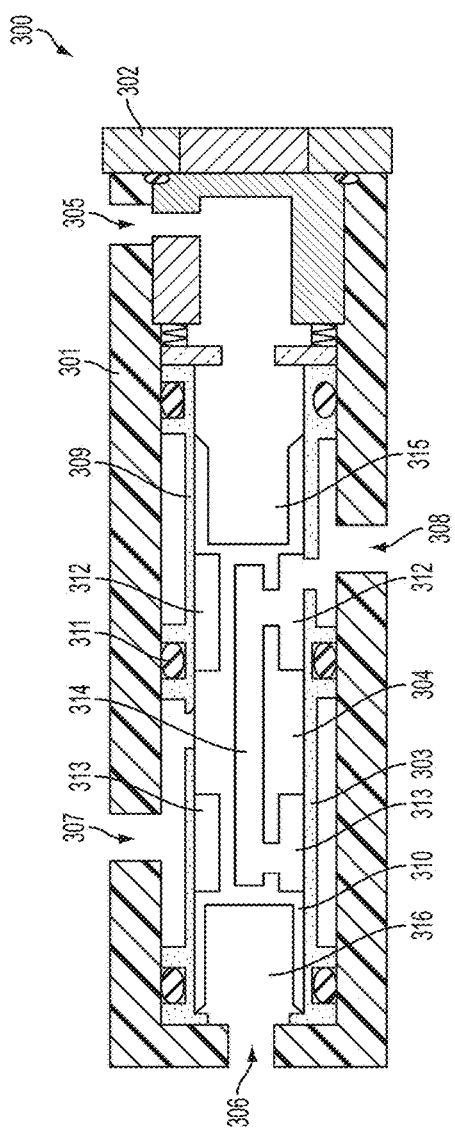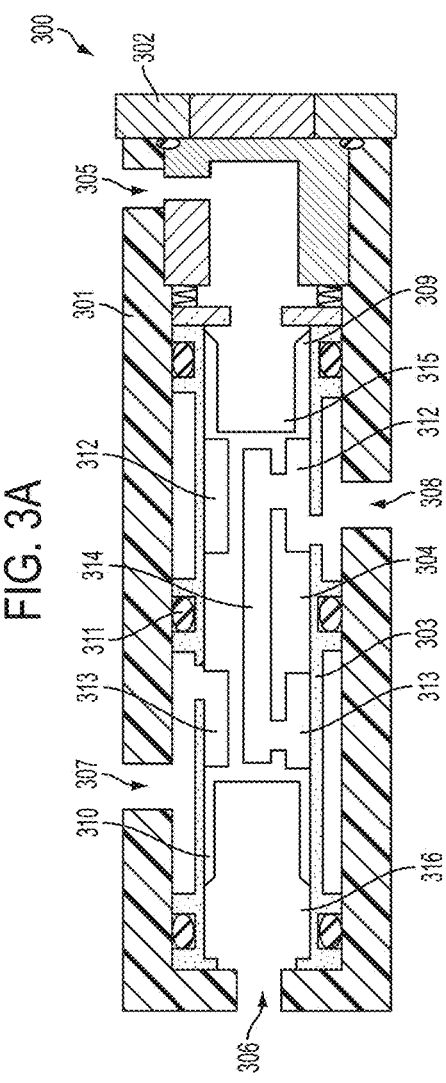
FIG. 3A
FIG. 3B

BACKFLOW PREVENTION VALVE

DOMESTIC PRIORITY

This application is a continuation application of the legally related U.S. Ser. No. 13/901124 filed May 23, 2013, the contents of which are incorporated by reference herein in their entirety.

Embodiments of the invention relate to engine bleed systems and, in particular, to a backflow prevention valve in an engine bleed system.

BACKGROUND OF THE INVENTION

Engine bleed air systems control air flow extracted from an engine. Reverse flow within the bleed air system may result in the stalling or damage to the engine.

BRIEF DESCRIPTION OF THE INVENTION

Embodiments of the invention relate to a valve assembly includes an outer housing having a first opening in fluid communication with a first fluid, a second opening in fluid communication with a second fluid, a third opening in fluid communication with a third fluid and a fourth opening in fluid communication with a fourth fluid. The valve assembly includes a piston configured to slide within the outer housing into a first position at which the third opening is blocked from fluid communication with the fourth opening based on a fluid pressure of the first fluid being greater than a fluid pressure of the fourth fluid. The piston is further configured to slide within the outer housing into a second position at which the third opening is in fluid communication with the fourth opening based on the fluid pressure of the second fluid being greater than the fluid pressure of the fourth fluid.

Embodiments of the invention also relate to a reverse-flow prevention valve. The reverse-flow prevention valve includes an outer housing having a first opening configured to be in fluid communication with a first fluid, a second opening configured to be in fluid communication with a second fluid, a third opening configured to be in fluid communication with a third fluid, and a fourth opening configured to be in fluid communication with ambient air. The reverse-flow prevention valve also includes a piston configured to slide within the outer housing. The piston has a first end forming a seal with respect to the outer housing and being in contact with the first fluid, a second end forming a seal with respect to the outer housing and being in contact with the second fluid, a first recess in an outer radial surface of the piston and a second recess in the outer radial surface of the piston. The first recess is in fluid communication with the second recess. The first recess is configured to be sealed off from the third opening when the piston is in a first sliding position with respect to the outer housing, and the first recess is configured to be in fluid communication with the third opening, to transmit a fluid between the third opening and the fourth opening, when the piston is in a second sliding position with respect to the outer housing.

Embodiments of the invention also relate to an engine bleed-air system including a bleed valve configured to receive as an input a first gas flow from an engine and a second gas flow from ambient air, and an electrical control signal configured to control a ratio of the first gas flow and the second gas flow to be output as a third gas flow. The engine bleed-air system also includes a servo chamber including a first piston, the servo chamber configured to receive the third gas flow and to control a position of the first piston to control an output gas flow from the engine. The engine bleed-air system also includes a reverse-flow prevention valve in fluid communication with the first gas flow, the second gas flow, the third gas flow and the fourth gas flow. The reverse-flow prevention valve is configured to expose the third gas flow to ambient air based on the fourth gas flow having a pressure greater than the pressure of the first gas flow and to block the third gas flow from the ambient air based on the first gas flow having a pressure greater than the pressure of the fourth gas flow.

BRIEF DESCRIPTION OF THE DRAWINGS

FIG. 3A illustrates a reverse-flow prevention valve in a first position according to an embodiment of the invention;

FIG. 3B illustrates a reverse-flow prevention valve in a second position according to an embodiment of the invention;

DETAILED DESCRIPTION OF THE INVENTION

Backflow of air, exhaust or other gases or fluids into an engine may cause stalls or other failures. Embodiments of the invention relate to a valve assembly for preventing the back-flow of air, exhaust or other gases or fluids.

Figure 1:
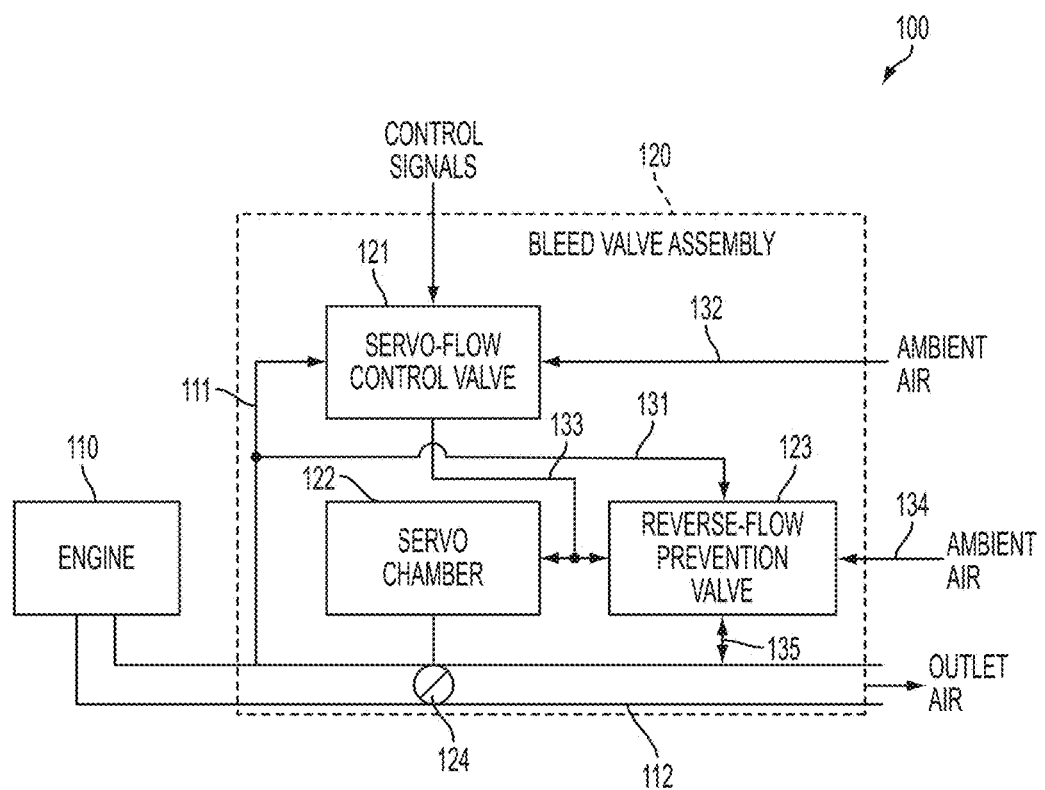
FIG. 1 illustrates an engine bleed-air flow system according to one embodiment of the invention.

FIG. 1 illustrates an engine bleed-air flow system 100 according to an embodiment of the invention. The system 100 includes an engine 110 and a bleed valve assembly 120. The bleed valve assembly 120 includes a servo-flow control valve 121, a servo-chamber 122 and a reverse-flow prevention valve 123. The engine 110 generates a fluid flow through a channel 112. In one embodiment, the fluid flows are exhaust gases from a high pressure stage of the engine 110. The bleed valve extracts a first fluid from the bleed air flow in channel 111 which is used for actuating the bleed air valve.

The servo-flow control valve 121 also exhausts an ambient air flow 132. The servo-flow control valve 121 meters the first fluid flow 111 exhausting excess fluid flow to the ambient air flow 132 based on control signals and outputs the resulting remaining servo-fluid flow 133. The ratio of the first fluid flow 111 to the ambient air flow 132 in the servo-fluid flow 133 may range anywhere from 0:1 (no first fluid flow 111 and all ambient air flow 132, 1:0 (all fluid flow 111 and no ambient air flow 132) or any ratio in-between, such as 1:1, 2:1, 3:1, etc.

The servo-fluid flow 133 enters the servo chamber 122 and controls the state of a flow-control valve 124, which controls the second fluid flow through the channel 112. A portion 131 of the first fluid flow 111, a portion 135 of the second fluid flow, the servo-fluid flow 133 and the ambient air flow 134 are all in fluid communication with the reverse-flow prevention valve 123. In particular, the reverse-flow prevention valve 123 is configured to permit fluid flow between the servo-fluid flow 133 and the ambient air flow 134 when the reverse-flow prevention valve 123 is in a reverse-flow prevention position. The reverse-flow prevention valve 123 does not permit fluid flow from the servo-fluid flow 133 to the ambient air 134, or vice-versa, when the reverse-flow prevention valve 123 is in a normal operation mode. An example of bleed valve assembly 120 is illustrated in greater detail in FIG. 2.

Figure 2:
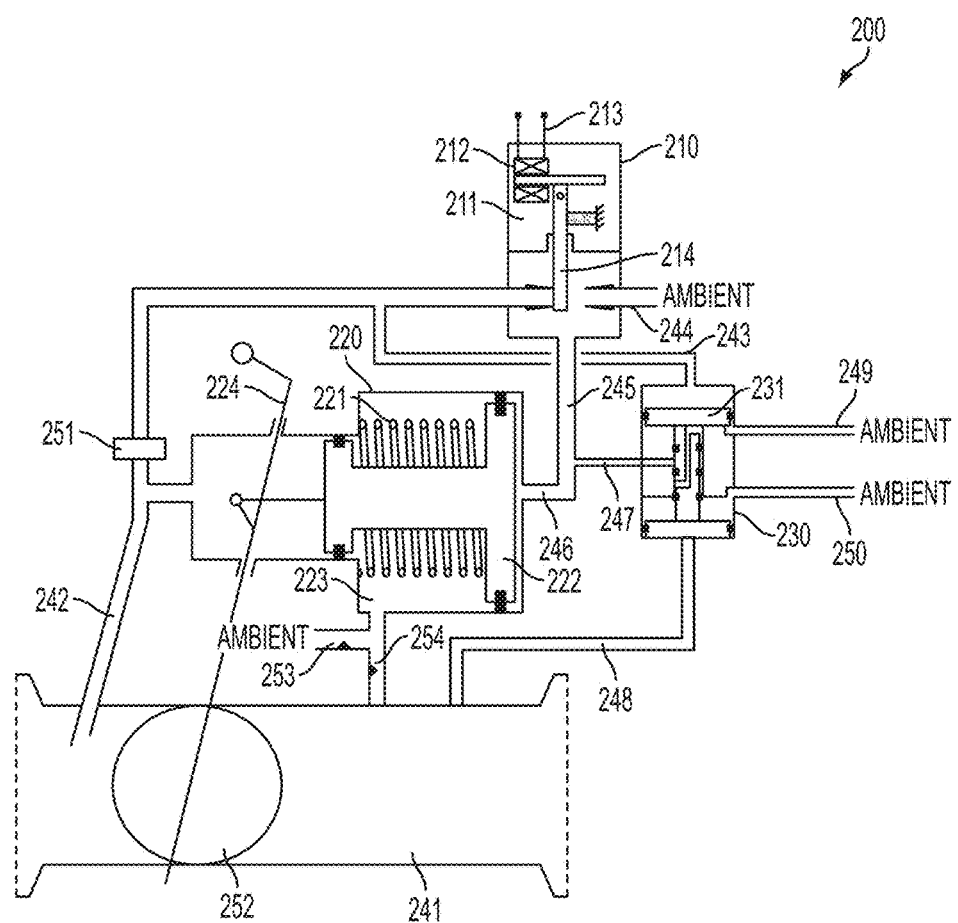
FIG. 2 illustrates a bleed valve assembly according to another embodiment of the invention.

FIG. 2 illustrates bleed valve assembly 200 according to an embodiment of the invention, which may correspond to bleed valve assembly 120 illustrated in FIG. 1. The assembly 200 includes the servo-flow control valve 210, the servo-chamber 220, and the reverse-flow prevention valve assembly 230. A fluid flow from an engine is output, during normal operation (forward-flow), in a left-to-right direction of FIG. 2, through the duct 241 via a flow-control valve 252. A bleed-air channel 242 bleeds a portion of the fluid from the duct 241 upstream of the valve 252 to the servo-flow control valve 210. The bleed-air channel 242 may include a filter 251. The servo-flow control valve 210 includes an actuator 211, which may be a lever 214 controlled by a wound coil 212 energized by control power lines 213. Energizing the coil 212 causes the lever 214 to move, which adjusts the flow of ambient air from the ambient air channel 244 and bleed air from the bleed-air channel 242 that is output to the servo-chamber flow channel 245.

The servo-chamber flow channel 245 has two branches 246 and 247. The first branch 246 is open to the servo chamber 220 and the second branch 247 is open to the reverse-flow prevention valve assembly 230. The servo chamber 220 includes a piston 222 having a larger end, or an end having a larger diameter, in a large chamber portion 223. The piston 222 is connected to a spring 221. The large chamber portion 223 may be selectively open to ambient air via the channel 253 and to the duct 241, downstream of the valve 252, via the channel 254. The flow from the servo-chamber flow channel 245 pushes the piston 222 linearly away from the inlet to the large chamber portion 223, actuating the valve 252 via the valve-adjustment arm 224. In other words, the bleed air from the bleed-air channel 242 and electrical control signals 213 may be used to control the position of the piston 222, and to thereby control the flow of fluid, such as air or exhaust, through the duct 241.

The reverse-flow prevention valve assembly 230 is in fluid communication with the first fluid flow via a channel 243, is in fluid communication with the servo-chamber flow channel 245 via the branch channel 247 and is in fluid communication with the duct 241 via the channel 248. The first fluid flow in the channels 242 and 243 correspond to an input flow, and the second fluid flow in the duct 241 corresponds to an output flow. The reverse-flow prevention valve assembly 230 is also connected to ambient air via channels 249 and 250. The reverse-flow prevention valve assembly 230 includes a piston 231. The piston 231 moves between a first position and a second position based on the difference between the input flow pressure and the output flow pressure. In particular, when the input flow pressure is greater than the output flow pressure, the channel 247 is not in fluid communication with the channels 249 and 250, and the servo-chamber flow is cut off from the ambient air. In contrast, when the output flow pressure is greater than the input flow pressure, the piston 231 moves such that the channel 247 is in fluid communication with the ambient air channels 249 and 250, and the servo-channel flow is in communication with the ambient air. In embodiments of the invention, the servo-chamber 220 is in communication with the ambient air only when the flow direction in the duct 241 is from right-to-left with reference to the orientation illustrated in FIG. 2.

FIGS. 3A and 3B illustrate the reverse-flow prevention valve assembly 300 in additional detail. The reverse-flow prevention valve assembly 300 corresponds to the similar structures 230 of FIGS. 2 and 123 of FIG. 1.

The reverse-flow prevention valve assembly 300 includes an outer housing 301, a seal structure 303 and a piston 304. The outer housing 301 is sealed by a plug 302. The outer housing 301 includes a first opening 305, a second opening 306, a third opening 307 and a fourth opening 308. The first opening 305 is in fluid communication with a first fluid flow; the second opening 306 is in fluid communication with a second fluid flow; the third opening 307 is in fluid communication with a third fluid flow; and the fourth opening 308 is in fluid communication with a fourth fluid flow. In one embodiment, the first fluid flow is a bleed-air flow from an engine, the second fluid flow is flow from the engine downstream of a flow-control valve, the third fluid flow is servo-chamber control air flow and the fourth fluid flow is ambient air. In one embodiment, the outer housing 301 is formed integrally with the housing of the bleed valve assembly 200 of FIG. 2.

The piston 304 is configured to slide in a longitudinal axial direction within the outer housing 301. In one embodiment, the sealing structure 303 is located between the outer housing 301 and the piston 304 along an entire longitudinal axial length of the piston 304. The sealing structure 303 includes seals 311, which may be elastic 0-rings, metal C-rings, or any other type of seal. The sealing structure 303 seals the first opening 305 from the second, third and fourth openings 306, 307 and 308. The sealing structure 303 also seals the second opening 306 from the first, third and fourth openings 305, 307 and 308. In addition, when the piston 304 is in a first position, illustrated in FIG. 3A, the sealing structure 303 together with the piston 304 seal the third opening 307 from the fourth opening 308. When the piston 304 is in a second position, illustrated in FIG. 3B, the sealing structure 303 together with the piston 304 permit fluid flow between the third opening 307 and the fourth opening 308.

The piston 304 includes a first annular groove or recess 312 and a second annular groove or recess 313 in an outer radial surface of the piston 304. A channel 314 connects the first annular groove 312 with the second annular groove 313. When the piston 304 is in the first position, as illustrated in FIG. 3A, the second annular groove 313 is not aligned with an opening in the seal structure 303, resulting in the ambient air of the fourth opening 308 being sealed from the third opening 307. However, when the piston 304 is in the second position, as illustrated in FIG. 3B, the second annular groove 313 is aligned with an opening in the sealing structure 303, permitting fluid communication between the third opening 307 and the fourth opening 308.

The piston 304 further includes a cup-shaped first end 309 and a cup-shaped second end 310. The cup-shaped first end 309 forms a cavity 315 to receive the first fluid from the first opening 305, and the cup-shaped second end 310 forms a cavity 316 to receive the second fluid 316 from the second opening 306. In one embodiment, the first fluid corresponds to an input flow, or the fluid flow through the bleed channel 242 and the channel 243 of FIG. 2. The second fluid may correspond to an output flow, or a flow from a portion of the duct 241 of FIG. 2 downstream from the flow control valve 252, via the channel 248. Accordingly, when the pressure in the channel 248 is greater than the pressure in the channel 243, the pressure at the second end 310 of the piston 304 is greater than the pressure at the first end 309 of the piston 304, and the piston 304 moves to the second position, as illustrated in FIG. 3B. This position may indicate that a back-flow condition exists. The back-flow condition may be automatically corrected by permitting fluid flow between the third opening 307 and the fourth opening 308, permitting the ambient air 308 to be provided to the servo chamber 220 of FIG. 2, which in turn controls the flow-control valve 252 to reduce or eliminate the back-flow condition.

Figure 4:
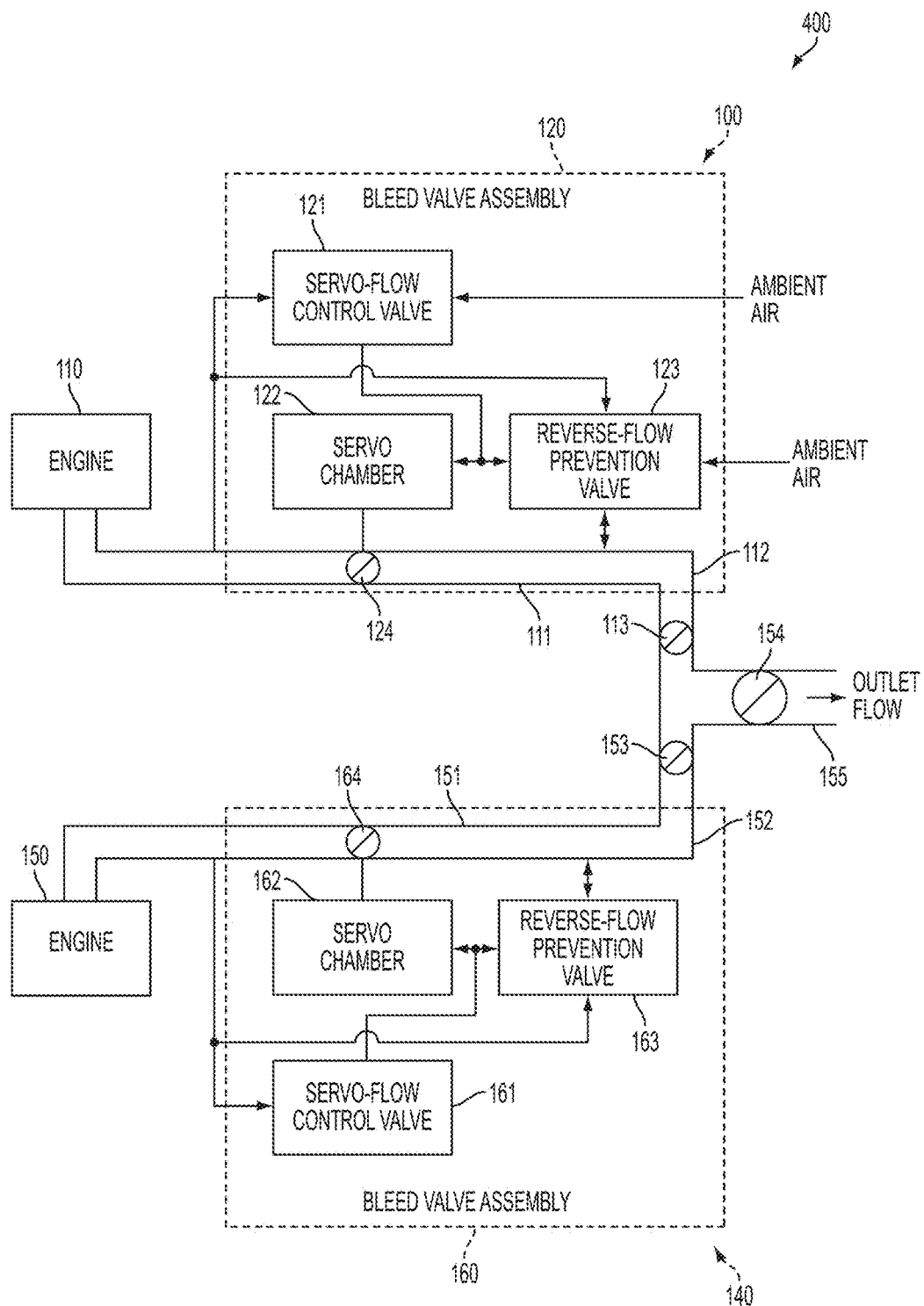
FIG. 4 illustrates an engine bleed-air flow system according to another embodiment of the invention.

FIG. 4 illustrates an example of an engine bleed-air flow system 400 in which a back-flow condition may occur and be corrected. The system 400 includes the engine bleed-air flow system 100 of FIG. 1 having an output channel 112 that connects with the output channel 152 of a second engine bleed-air flow system 140. The second bleed-air flow system 140 is similar to the first engine bleed-air flow system 100, including the engine 150 and bleed valve assembly 160, where the bleed valve assembly 160 includes a servo-flow control valve 161, servo chamber 162 and reverse-flow prevention valve 163. The servo chamber 162 controls a state of a flow-control valve 164 to control the flow of fluid, such as air or exhaust, through the channel 151 from the engine 150 to the outlet 155.

As illustrated in FIG. 4, pressure regulating valves 113 and 153 may be located in the channels 111 and 151, respectively. The channels 111 and 151 are each in fluid communication with the outlet channel 155, such that the flow from the channel 111 combines with the flow from the channel 151 to be output via the output channel 155. In addition, a flow-control valve 154 may be located in the output channel 155 to control output flow from the valve 154.

As an example of a condition which could cause a back-flow or reverse-flow that could stall or otherwise harm an engine, if the flow pressure from the second engine 150 significantly exceeds that of the first engine 110, the fluid flow from the channel 151 could enter the channel 111. Alternatively, failure of the pressure regulating valve 113 could cause a reverse flow. In each case, the reverse-flow prevention valve 123 can control the servo chamber 122, which in turn controls the flow control valve 124, to prevent reverse flow into the engine 110.

Embodiments of the invention relate to a valve and system for preventing reverse flow. In particular, embodiments relate to a reverse-flow prevention valve having a piston that slides within a housing according to the difference between a first flow pressure in a first channel and a second flow pressure in a second channel. When the first flow pressure is greater than the second flow pressure, two openings in the housing are blocked from communication with each other by the piston. However, when the second flow pressure is greater than the first flow pressure, the piston slides into a position that permits fluid communication between the two openings, which reduces or eliminates reverse flow in a bleed-air system in which the reverse-flow prevention valve is included.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An engine bleed-air system, comprising:
   a bleed valve configured to receive as an input a first gas flow from an engine and a second gas flow from ambient air, and an electrical control signal configured to control a ratio of the first gas flow and the second gas flow to be output as a third gas flow;
   a servo chamber including a first piston, the servo chamber configured to receive the third gas flow and to control a position of the first piston to control an output gas flow from the engine; and
   a reverse-flow prevention valve in fluid communication with the first gas flow, the second gas flow, the third gas flow and a fourth gas flow, the reverse-flow prevention valve configured to expose the third gas flow to ambient air based on the fourth gas flow having a pressure greater than the pressure of the first gas flow, and the reverse-flow prevention valve configured to block the third gas flow from the ambient air based on the first gas flow having a pressure greater than the pressure of the fourth gas flow.

2. The engine bleed-air system of claim 1, wherein the reverse-flow prevention valve comprises:
   an outer housing having a first opening configured to be in fluid communication with the first gas flow, a second opening configured to be in fluid communication with the fourth gas flow, a third opening configured to be in fluid communication with the third gas flow, and a fourth opening configured to be in fluid communication with the ambient air; and
   a second piston configured to slide within the outer housing, the second piston having a first end forming a seal with respect to the outer housing and being in contact with the first gas flow, a second end forming a seal with respect to the outer housing and being in contact with the second gas flow, a first recess in an outer radial surface of the second piston and a second recess in the outer radial surface of the second piston, the first recess in fluid communication with the second recess,
   wherein the first recess is configured to be sealed off from the third opening when the second piston is in a first sliding position with respect to the outer housing, and the first recess is configured to be in fluid communication with the third opening, to transmit a gas between the third opening and the fourth opening, when the second piston is in a second sliding position with respect to the outer housing.

3. The engine bleed-air system of claim 2, wherein the first recess and the second recess are annular recesses extending around the outer circumference of the second piston.

4. The engine bleed-air system of claim 2, wherein the second piston includes a channel located radially-inward of the first and second recesses and connecting the first and second recesses.

5. The engine bleed-air system of claim 2, further comprising:
   a sealing structure located between the outer housing and the second piston along an entire length of the second piston, the second piston configured to slide with respect to the sealing structure, the sealing structure configured to seal the first opening from the second opening, the third opening and the fourth opening.

6. The engine bleed-air system of claim 2, wherein the second piston includes a first cup-shaped recess at the first end to receive a first gas of the first gas flow and a second cup-shaped recess at the second end to receive a second gas of the fourth gas flow.

7. The engine bleed-air system of claim 2, wherein an inner surface of the outer housing is cylindrical.

8. The engine bleed-air system of claim 1, further comprising a first engine configured to emit the fourth gas flow, wherein the first gas flow is a bleed gas flow that is bled from the fourth gas flow via a filter.

9. The engine bleed-air system of claim 8, further comprising a second engine configured to emit a fifth gas flow, the fifth gas flow in fluid communication with the fourth gas flow via at least one control valve, the fourth gas flow and the fifth gas flow configured to be combined into sixth output gas flow downstream from the fourth and fifth gas flows.

* * * * *